US010338640B2

(12) United States Patent
Matsuzawa et al.

(10) Patent No.: US 10,338,640 B2
(45) Date of Patent: Jul. 2, 2019

(54) HEAD MOUNTED DISPLAY (71) Applicant: KYOCERA Corporation, Kyoto-shi, Kyoto (JP)

(72) Inventors: Jun Matsuzawa, Kawasaki (JP); Keisuke Okada, Yokohama (JP); Tomohiro Degawa, Tokyo (JP); Yoshiteru Kurosaki, Yokohama (JP); Kouichirou Fujihara, Yokohama (JP); Shingo Ito, Kawasaki (JP); Susumu Ozawa, Ebina (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/469,966

(22) Filed: Mar. 27, 2017

(65) Prior Publication Data
US 2017/0277223 A1    Sep. 28, 2017

(30) Foreign Application Priority Data

Mar. 28, 2016  (JP) ................................ 2016-064383

(51) Int. Cl.
*G06F 1/16* (2006.01)
(52) U.S. Cl.
CPC ............ *G06F 1/1632* (2013.01); *G06F 1/163* (2013.01); *G06F 1/1637* (2013.01)
(58) Field of Classification Search
CPC ....... G06F 1/1632; G06F 1/163; G06F 1/1637
See application file for complete search history.

(56) References Cited

U.S. PATENT DOCUMENTS

| 5,392,158 | A | * | 2/1995 | Tosaki | G02B 27/017 348/42 |
| 5,603,507 | A | * | 2/1997 | Tice | A63F 13/10 473/29 |
| 5,636,787 | A | * | 6/1997 | Gowhari | A61L 9/12 239/36 |
| 5,683,297 | A | * | 11/1997 | Raviv | A63F 13/02 273/DIG. 17 |
| 5,973,656 | A | * | 10/1999 | Yokoi | G02B 26/105 345/82 |
| 9,767,617 | B2 | * | 9/2017 | Torii | G06T 19/006 |
| 2006/0265378 | A1 | * | 11/2006 | Koseki | G06F 17/30067 |
| 2007/0046890 | A1 | * | 3/2007 | Chen | G02C 11/00 351/120 |
| 2012/0268433 | A1 | | 10/2012 | Horii et al. | |

(Continued)

FOREIGN PATENT DOCUMENTS

JP    2012-231259 A    11/2012

*Primary Examiner* — Ricardo Osorio
(74) *Attorney, Agent, or Firm* — Hauptman Ham, LLP (57) ABSTRACT There is provided a head mounted display comprising: an interface unit configured to be connected with a cartridge; a determinator configured to determine whether the head mounted display is inside a specific area or not when the cartridge is connected to the interface unit; and at least one controller configured to execute, when the determinator determines that the head mounted display is inside the specific area, an application based on first data that is acquired from the cartridge, and to execute, when the determinator determines that the head mounted display is not inside the specific area, another application based on second data that is acquired from the cartridge.

6 Claims, 9 Drawing Sheets (56) References Cited

U.S. PATENT DOCUMENTS

| | | | |
|---|---|---|---|
| 2014/0361976 A1* | 12/2014 | Osman | G02B 27/0172 |
| | | | 345/156 |
| 2016/0049012 A1* | 2/2016 | Torii | G06T 19/006 |
| | | | 345/633 |
| 2017/0213377 A1* | 7/2017 | Torii | G06T 11/60 |
| 2017/0276941 A1* | 9/2017 | Fujihara | G02B 27/017 |
| 2017/0276949 A1* | 9/2017 | Okada | G09G 3/36 |
| 2017/0276950 A1* | 9/2017 | Ozawa | G02B 27/0172 |
| 2017/0277221 A1* | 9/2017 | Degawa | G06F 1/163 |
| 2017/0277222 A1* | 9/2017 | Matsuzawa | G06F 1/163 |
| 2017/0287228 A1* | 10/2017 | Torii | G06T 19/006 |

* cited by examiner

HEAD MOUNTED DISPLAY

CROSS-REFERENCE TO RELATED APPLICATION

The present application claims priority to and incorporates by reference the entire contents of Japanese Patent Application No. 2016-064383 filed in Japan on Mar. 28, 2016.

FIELD

The present application relates to a head mounted display.

BACKGROUND

As a display device, there is provided a display device which is to be mounted on a head of a user.

A display device to be mounted on a head of a user having enhanced usability is desired.

SUMMARY

A head mounted display is disclosed.

According to one aspect, there is provided a head mounted display comprising: an interface unit configured to be connected with a cartridge; a determinator configured to determine whether the head mounted display is inside a specific area or not when the cartridge is connected to the interface unit; and at least one controller configured to execute, when the determinator determines that the head mounted display is inside the specific area, an application based on first data that is acquired from the cartridge, and to execute, when the determinator determines that the head mounted display is not inside the specific area, another application based on second data that is acquired from the cartridge.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

Embodiments of a head mounted display according to the present application will be described in detail with reference to the drawings. A user of the head mounted display according to the present application may receive various services through the head mounted display by connecting an externally connectable cartridge to the head mounted display and loading specific contents into the head mounted display from the cartridge. A cartridge that can be externally connected to the head mounted display may be provided by various indoor/outdoor facilities and the like capable of providing services through the head mounted display, including a business park, a shopping center, a fashion mall, a park, an amusement park, a high-technology park, a home and the like.

Figure 1:
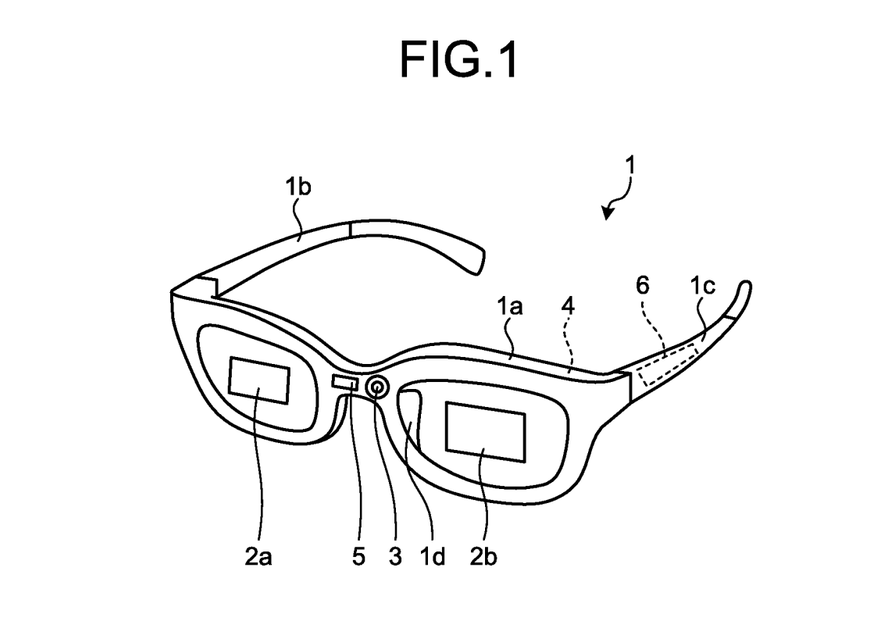
FIG. 1 is a diagram illustrating a schematic external configuration of a head mounted display according to embodiments.

FIG. 1 is a diagram illustrating a schematic external configuration of the head mounted display according to embodiments. As illustrated in FIG. 1, a head mounted display 1 is shaped as eyeglasses, and includes a front 1a, a temple 1b, a temple 1c, and a nose pad 1d. The shape of the head mounted display 1 illustrated in FIG. 1 is merely an example, and the head mounted display 1 is not limited to the shape illustrated in FIG. 1 as long as functions of a wearable terminal to be mounted on a head can be realized.

The front 1a is formed to at least partially surround outer circumferential portions of a display 2a and a display 2b. The front 1a is a part that comes in front of eyes of a user of the head mounted display 1 when the head mounted display 1 is worn by the user. The nose pad 1d includes a pair of pads (not illustrated), and contacts a nose of the user of the head mounted display 1 by pinching the nose when the head mounted display 1 is worn by the user. The nose pad 1d contributes to support the head mounted display 1 worn by the user in such a manner that the head mounted display 1 does not slip off a face of the user in the gravitational direction and its mounted attitude is maintained as much as possible.

An imager 3, an imager 4, a detector 5, an operation unit 6 and the like are also installed at the front 1a.

The temple 1b and the temple 1c are formed to have the same bar shape. The temple 1b and the temple 1c are parts which are arranged along sides of the head of the user of the head mounted display 1 when the head mounted display 1 is worn by the user. One end portion of the temple 1b and one end portion of the temple 1c are parts which are connected to the front 1a via hinges (not illustrated) in a manner capable of being folded. The other end portion of the temple 1b and the other end portion of the temple 1c are parts which are fitted to the ears of the user of the head mounted display 1 when the head mounted display 1 is worn by the user. Like the nose pad 1d, the temple 1b and the temple 1c also contribute to support the head mounted display 1 worn by the user in such a manner that the head mounted display 1 does not slip off the face of the user in the gravitational direction and its mounted attitude is maintained as much as possible.

Figure 2:
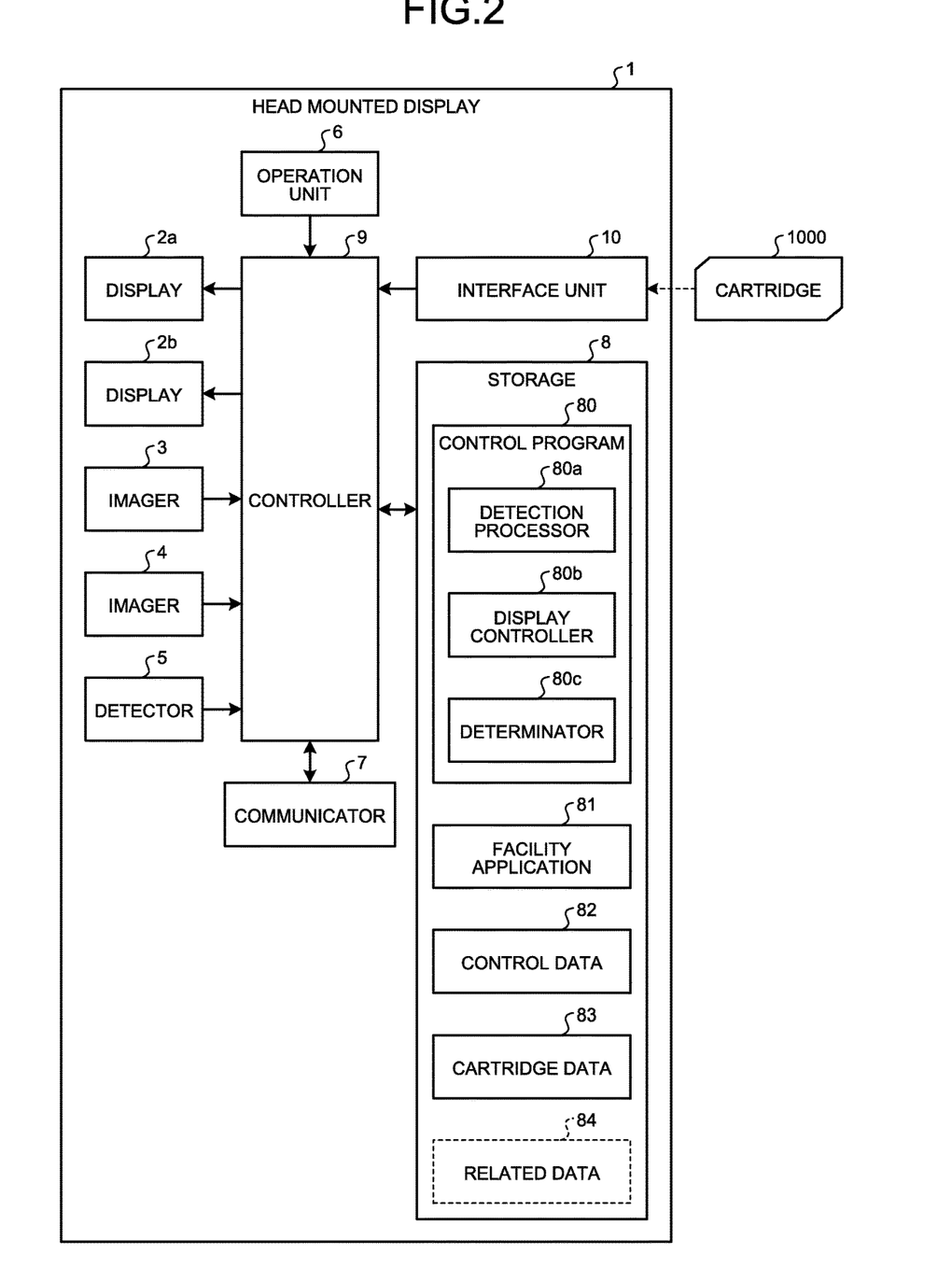
FIG. 2 is a block diagram illustrating an example of a functional configuration of the head mounted display according to embodiments.

FIG. 2 is a block diagram illustrating an example of a functional configuration of the head mounted display according to embodiments.

As illustrated in FIG. 2, the head mounted display 1 is configured to include a display 2a, a display 2b, an imager 3, an imager 4, a detector 5, an operation unit 6, a communicator 7, a storage 8, a controller 9, and an interface unit 10.

Each of the display 2a and the display 2b may include a transflective or transmissive display device, such as a liquid crystal display or an organic electro-luminescence (EL) panel. The display 2a and display 2b display various pieces of information according to control signals from the controller 9. Each of the display 2a and the display 2b may be a projection device which projects images on the retinae of the user by using a light source.

Each of the imager 3 and the imager 4 electronically captures an image by an image sensor such as a charge coupled device (CCD) or a complementary metal oxide semiconductor (CMOS). Each of the imager 3 and the imager 4 converts the captured image into a signal, and outputs the signal to the controller 9. For example, the imager 3 is a front camera for capturing the view in front of the user wearing the head mounted display 1. For example, the imager 4 is a rear camera for capturing the user wearing the head mounted display 1.

The detector 5 performs various types of detection. The detector 5 is capable of detecting a detection target, a change in state of the detection target, and the like by using at least one of visible light, infrared light, ultraviolet light, radio waves, acoustic waves, magnetism, and capacitance. A detection target may be a still object, a moving object, a living object, or a non-living object. The detector 5 outputs a detection result to the controller 9. The detector 5 may include an accelerometer. The accelerometer is capable of detecting acceleration acting on the head mounted display 1. The detection result of the accelerometer may be used to detect moving and stopping of the user carrying the head mounted display 1. The detector 5 is capable of detecting a current position of the head mounted display 1. The detector 5 may detect the current position by a global positioning system (GPS) receiver. The detector 5 may alternatively detect the current position based on a base station communicated by the communicator 7 for wireless communication. The detector 5 may alternatively detect the current position by a plurality of methods in combination.

The operation unit 6 receives, from the user, operation input for activation or deactivation of the head mounted display 1, changes in various settings including operation settings, and the like. The operation unit 6 converts the operation input from the user into a signal, and outputs the signal to the controller 9.

The communicator 7 is capable of communicating with other devices. For example, the communicator 7 is capable of transmitting/receiving, by a predetermined communication protocol, various pieces of information which are to be exchanged with another head mounted display or a facility server installed in a facility. The communicator 7 is capable of establishing a communication connection to another head mounted display. One or a plurality of communication standards for short range wireless communication may be supported by the communicator 7. The communication standards for short range wireless communication include IEEE 802.11, Bluetooth (registered trademark), Infrared Data Association (IrDA), Short range Communication (NFC), and Wireless Personal Area Network (WPAN), for example.

The storage 8 stores programs, data and the like. Programs stored in the storage 8 include a control program 80. Applications stored in the storage 8 include a facility application 81. Data stored in the storage 8 include control data 82, cartridge data 83, and related data 84.

The storage 8 may be used as a work area for temporarily storing a processing result of the controller 9. The storage 8 may be configured by any non-transitory storage medium such as a semiconductor storage medium or a magnetic storage medium. The storage 8 may include a plurality of types of storage media. The storage 8 may include a combination of a storage medium, such as a memory card, an optical disk or a magneto-optical disk, and a reader/writer device for the storage medium. The storage 8 may include a storage device to be used as a temporary storage area for a random access memory (RAM) or the like. Programs stored in the storage 8 may include a program (not illustrated) for supporting operation of an application. Programs stored in the storage 8 may be acquired from other devices, such as servers, by wireless or wired communication.

The control program 80 provides functions for various control by the head mounted display 1. Functions to be provided by the control program 80 include functions of a detection processor 80a, a display controller 80b, and a determinator 80c.

The detection processor 80a provides functions for performing various types of control of the head mounted display 1 based on detection results of the detector 5. The display controller 80b provides functions for performing display control for the display 2a and the display 2b.

The determinator 80c provides a function for determining, based on a detection result of the detector 5 or a communication result of the communicator 7, whether the head mounted display 1 is inside a specific area or not. A specific area is an area inside a facility where the facility application 81 is to be executed, for example. A specific area is an area inside a facility where the cartridge 1000 is provided, for example. A specific area is an area where equipment can be used through the head mounted display 1, for example.

The facility application 81 is an application for providing functions for a user of the head mounted display 1 to use equipment or the like installed inside a facility through the head mounted display 1, for example. For example, in the case of an amusement park, the facility application 81 corresponds to an application for displaying various pieces of information regarding the amusement park, such as a map of the amusement park, or an application for outputting moving images, sound and the like at the time of the user enjoying various attractions in the amusement park. The facility application 81 is capable of providing a function for acquiring the related data 84. The facility application 81 is capable of providing a function for causing the head mounted display 1 to output the acquired related data 84. When multiple pieces of equipment are installed in a facility, the facility application 81 may be configured as an application set including applications for respective pieces of equipment. The facility application 81 may be acquired from a cartridge 1000 which is externally connected to the interface unit 10.

The control data 82 is data used for various types of control of the head mounted display 1 performed by the functions provided by the control program 80. The control data 82 may be acquired from the cartridge 1000 which is externally connected to the interface unit 10.

The cartridge data 83 is data which is acquired from the cartridge 1000 externally connected to the interface unit 10. The cartridge data 83 is an example of first data. For example, in the case of an amusement park, the cartridge data 83 is used by the facility application 81 to output moving images, sound and the like to the head mounted display 1 according to a game story.

The related data 84 is data that is acquired in a specific area of an attraction facility. The related data 84 is an example of second data. For example, the related data 84 is data which is enabled to be acquired according to execution of the facility application 81. For example, the related data 84 is data which is generated by the execution of the facility application 81. For example, the related data 84 includes image data of a still image, a moving image or the like captured by an attraction side during an attraction. For example, when an attraction is a competition for a score, the related data 84 includes data indicating a ranking table. For example, the related data 84 may include advertisement information. For example, the advertisement information includes information about the attraction facility, related information of an attraction carried out, and information about related goods. For example, the related data 84 may be information such as an access code or an address for acquiring information about attractions carried out.

The controller 9 includes an arithmetic processing device. The arithmetic processing device may, but not limited to, include a central processing unit (CPU), a system-on-a-chip (SoC), a micro control unit (MCU), a field-programmable gate array (FPGA), and a co-processor. The controller 9 realizes various functions by integrally controlling the operation of the head mounted display 1. Specifically, the controller 9 realizes various types of control of the head mounted display 1 by referring to the control data 82 stored in the storage 8 as necessary and executing commands included in the control program 80 stored in the storage 8.

The interface unit 10 is open to allow insertion and connection of the cartridge 1000. When the cartridge 1000 is connected, the interface unit 10 acquires data stored in the cartridge 1000 and outputs the acquired data to the controller 9.

Figure 3:
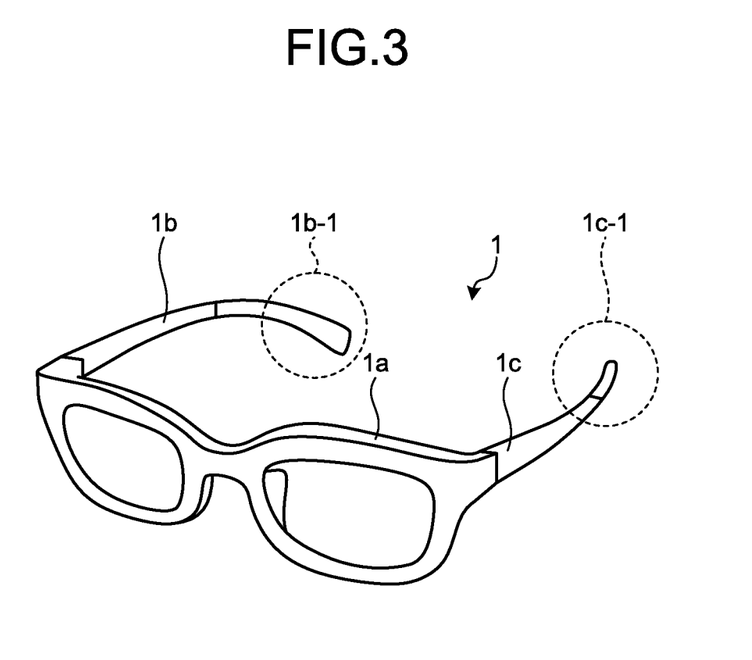
FIG. 3 is a diagram illustrating an example of an installation position of an interface unit according to embodiments.
Figure 4:
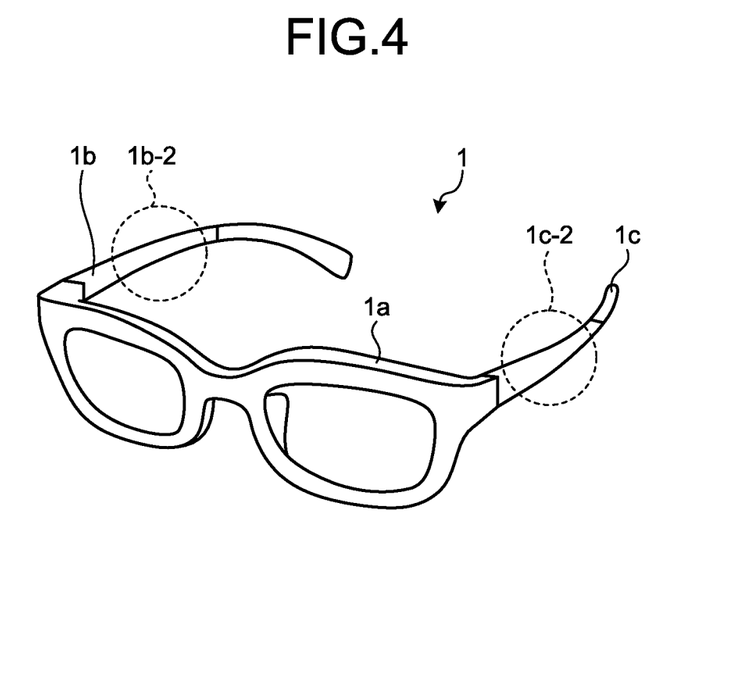
FIG. 4 is a diagram illustrating another example of the installation position of the interface unit according to embodiments.
Figure 5:
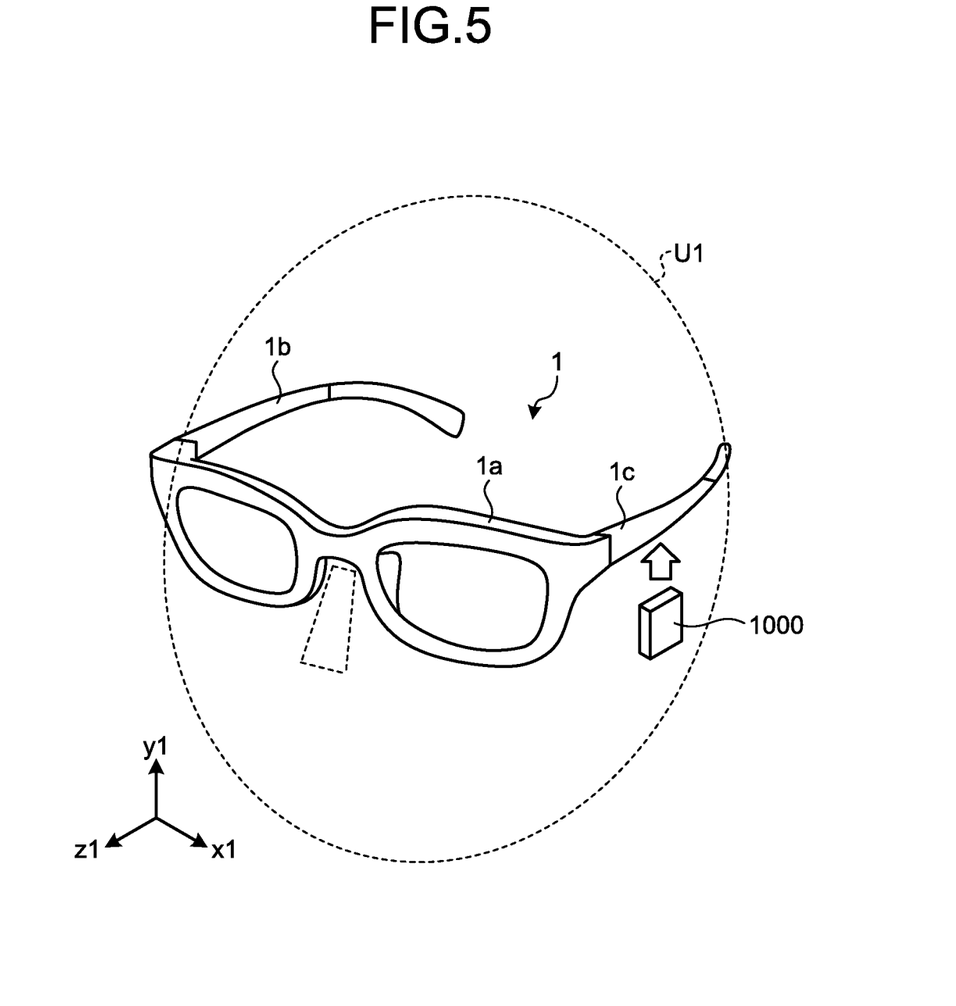
FIG. 5 is a diagram illustrating an example of a direction of an opening of the interface unit according to embodiments.
Figure 6:
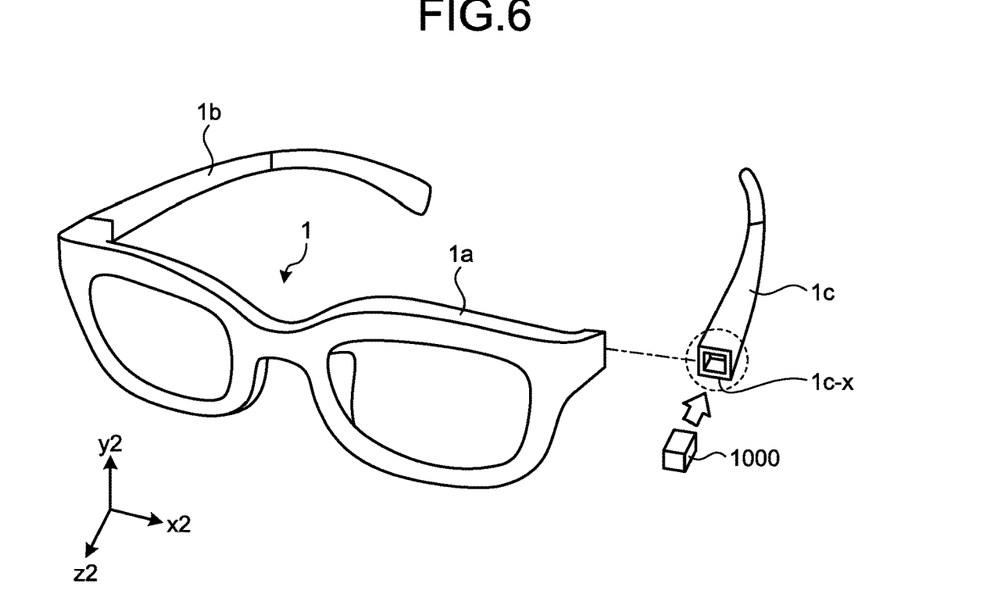
FIG. 6 is a diagram illustrating another example of the installation position and the direction of the opening of the interface unit according to embodiments.
Figure 7:
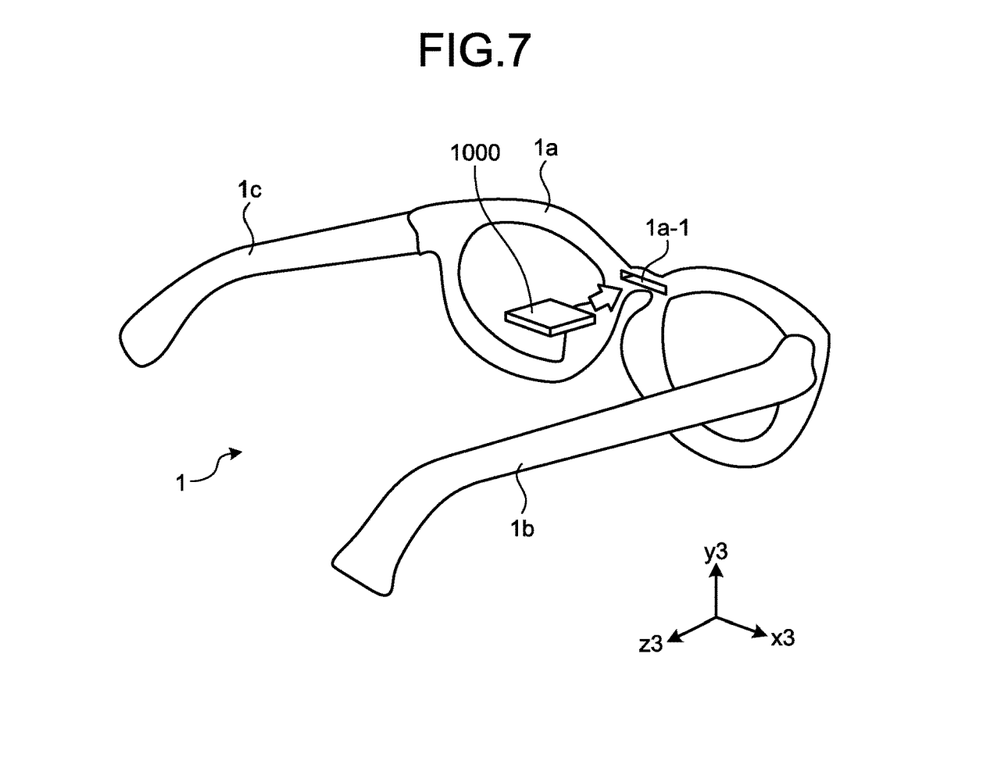
FIG. 7 is a diagram illustrating other example of the installation position and the direction of the opening of the interface unit according to embodiments.

In the following, examples of an installation position and a direction of an opening of the interface unit 10 provided to the head mounted display 1 will be described with reference to FIGS. 3 to 7. FIGS. 3 and 4 are diagrams illustrating examples of the installation position of the interface unit according to embodiments. FIG. 5 is a diagram illustrating an example of the direction of the opening of the interface unit according to embodiments. FIGS. 6 and 7 are diagrams illustrating other examples of the installation position and the direction of the opening of the interface unit according to embodiments.

As illustrated in FIG. 3, the interface unit 10 may be installed to the head mounted display 1 near an end portion 1b-1 of the temple 1b which is not connected to the front 1a, and near an end portion 1c-1 of the temple 1c which is not connected to the front 1a. Alternatively, as illustrated in FIG. 4, the interface unit 10 may be installed to the head mounted display 1 near a center 1b-2 of the temple 1b, and near a center 1c-2 of the temple 1c. For example, when the front 1a is heavier than the temples 1b, 1c due to including the imager 3, the imager 4, the detector 5, the operation unit 6 and the like, a wearing feeling of the head mounted display 1 may be improved by connecting the cartridge 1000 to the temple 1b (or the temple 1c) due to making the weight of the temple 1b (or 1c) closer to the weight of the front 1a.

When the interface units 10 are installed to the temple 1b and the temple 1c, the interface units 10 are open downward in the vertical direction when the head mounted display 1 is worn by the user of the head mounted display 1. According to such a configuration, dust and the like may be prevented from entering an opening (a part which are open to the outside) of the interface unit 10 of the head mounted display 1.

The direction of the opening of the interface unit 10 will be described with reference to FIG. 5. Coordinate axes, an x1-axis, a y1-axis, and a z1-axis, illustrated in FIG. 5 are orthogonal to one another. In the example illustrated in FIG. 5, the longitudinal direction of the front 1a of the head mounted display 1 coincides with a direction that is parallel to the x1-axis among the coordinate axes illustrated in FIG. 5. The interface unit 10 is open in an orientation which allows the cartridge 1000 to be inserted and connected to the head mounted display 1. Although not clearly illustrated, in the example illustrated in FIG. 5, when the head mounted display 1 is worn by a user U1, the interface unit 10 is open downward in the vertical direction, that is, in a direction parallel to a negative direction of the y1 axis.

The head mounted display 1 may have the interface unit 10 installed to each of the temple 1b and the temple 1c as illustrated in FIGS. 3 and 4, or may have the interface unit 10 installed to one of the temple 1b and the temple 1c.

Other example of the installation position and the direction of the opening of the interface unit 10 will be described with reference to FIG. 6. Coordinate axes, an x2-axis, a y2-axis, and a z2-axis, illustrated in FIG. 6 are orthogonal to one another. In the example illustrated in FIG. 6, the longitudinal direction of the front 1a of the head mounted display 1 coincides with a direction that is parallel to the x2-axis among the coordinate axes illustrated in FIG. 6. As illustrated in FIG. 6, the head mounted display 1 may have the interface unit 10 installed at a joint portion 1c-x of the temple 1c that contacts the front 1a when the temple 1c is completely opened. The interface unit 10 is open to allow insertion and connection of the cartridge 1000. In the example illustrated in FIG. 6, the interface unit 10 is illustrated in a state where it is open toward a positive direction of the z2-axis among the coordinate axes illustrated in FIG. 6. According to the head mounted display 1 of such a configuration, when the temple 1c is completely opened, the opening of the interface unit 10 is blocked by the front 1a, and the cartridge 1000 may be protected from an external impact and the like.

In the example illustrated in FIG. 6, the head mounted display 1 may be specified to include an opening which is open in the longitudinal direction of the temple 1b (or the temple 1c) at the temple 1b (or the temple 1c).

Other examples of the installation position and the direction of the opening of the interface unit 10 will be described with reference to FIG. 7. Coordinate axes, an x3-axis, a y3-axis, and a z3-axis, illustrated in FIG. 7 are orthogonal to one another. In the example illustrated in FIG. 7, the longitudinal direction of the front 1a of the head mounted display 1 coincides with a direction that is parallel to the x3-axis among the coordinate axes illustrated in FIG. 7. As illustrated in FIG. 7, the head mounted display 1 may have the interface unit 10 installed at a region 1a-1 of the front 1a which faces a face of the user. The interface unit 10 is open to allow insertion and connection of the cartridge 1000. In the example illustrated in FIG. 7, the interface unit 10 is illustrated in a state where it is open toward a positive direction of the z3-axis among the coordinate axes illustrated in FIG. 7. According to the head mounted display 1 of such a configuration, the cartridge 1000 connected to the interface unit 10 may be protected from an external impact and the like.

Figure 8:
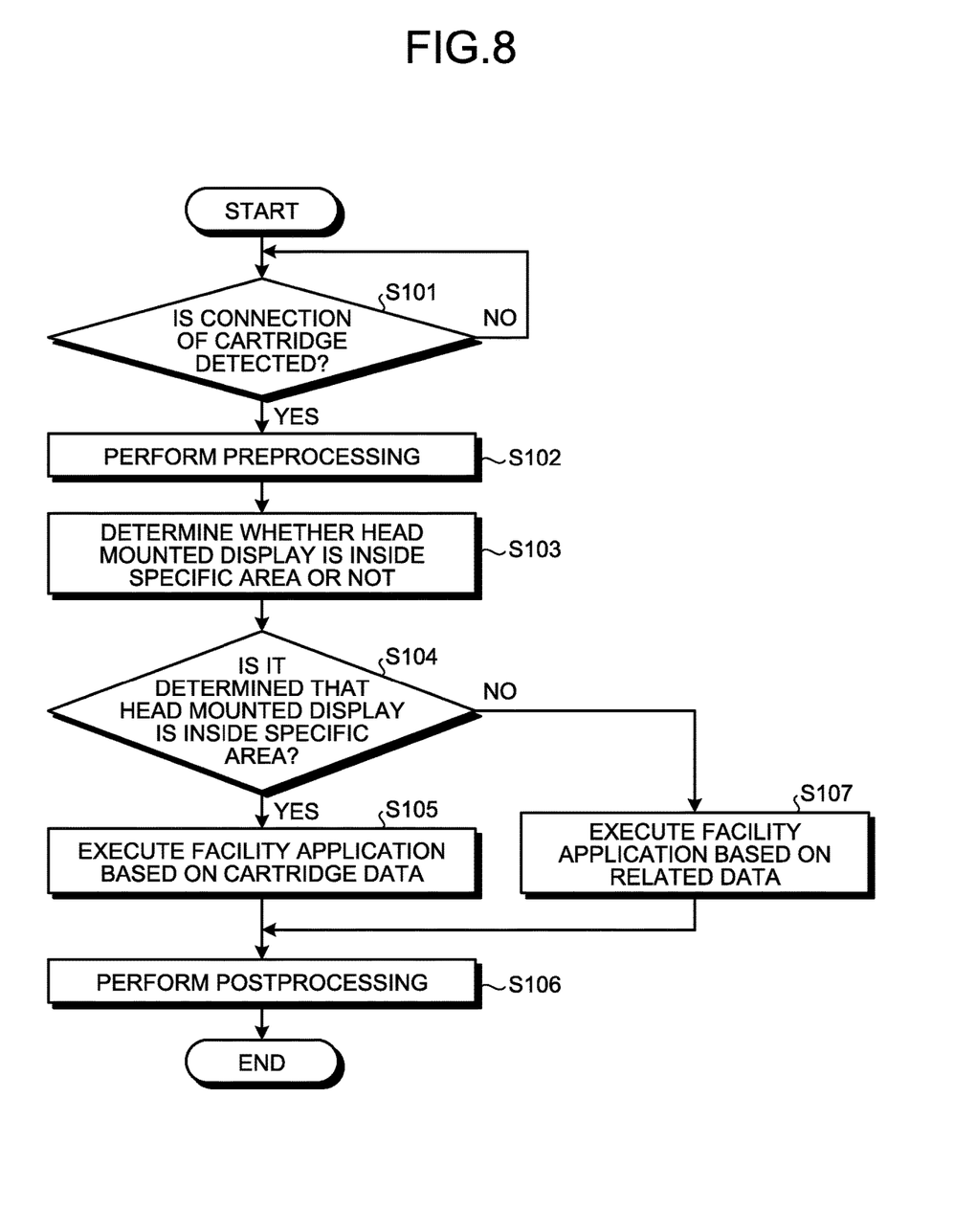
FIG. 8 is a flowchart illustrating an example of a process of control by the head mounted display according to embodiments.

FIG. 8 is a flowchart illustrating an example of a processing procedure of control by the head mounted display 1 according to embodiments. The processing procedure illustrated in FIG. 8 is realized by the controller 9 executing the control program 80.

As illustrated in FIG. 8, at Step S101, the controller 9 of the head mounted display 1 determines, using the interface unit 10, whether connection of the cartridge 1000 is detected or not. For example, the controller 9 determines that the connection of the cartridge 1000 is detected, when reading/writing of data with respect to the cartridge 1000 is enabled. When it is determined that the connection of the cartridge 1000 is not detected (No at Step S101), the controller 9 repeats the processing at Step S101. When it is determined that the connection of the cartridge 1000 is detected (Yes at Step S101), the controller 9 proceeds to Step S102.

The controller 9 performs preprocessing at Step S102. The preprocessing includes a mounting process, an acquisition process, a setting process and the like for the cartridge 1000. The mounting process includes a process of recognizing the cartridge 1000, and putting the cartridge 1000 into an available state. The acquisition process includes a process of acquiring data from the cartridge 1000. The setting process includes a process of changing a setting of the head mounted display 1 based on the cartridge data 83. When the preprocessing is complete, the controller 9 proceeds to Step S103.

At Step S103, the controller 9 determines, by the determinator 80c, whether the head mounted display 1 is inside a specific area. For example, the controller 9 determines that the head mounted display 1 is inside the specific area when the entry of the head mounted display 1 into equipment of the attraction facility is detected, or when the current position of the head mounted display 1 indicates a position inside the attraction facility. When it is determined that the head mounted display 1 is inside the specific area (Yes at Step S104), the controller 9 proceeds to Step S105.

At Step S105, the controller 9 executes the facility application 81 based on the cartridge data 83. The facility application 81 based on the cartridge data 83 includes using of the cartridge data 83 by the facility application 81, and outputting of the cartridge data 83 by the facility application 81, for example. The controller 9 outputs a still image, a moving image, a sound, a sound effect and the like to the head mounted display 1 based on the cartridge data 83 by executing the facility application 81. When the processing of the facility application 81 is complete, the controller 9 proceeds to Step S106.

The controller 9 performs postprocessing at Step S106. The postprocessing includes an unmounting process, a setting process and the like for the cartridge 1000. The unmounting process includes a process to make the cartridge 1000 removable. The setting processing includes a process to return the setting of the head mounted display 1 which has been changed based on the cartridge data 83 to the setting before the change. When the postprocessing is complete, the controller 9 ends the processing procedure illustrated in FIG. 8.

When it is determined that the head mounted display 1 is not inside the specific area (No at Step S104), the controller 9 proceeds to Step S107. At Step S107, the controller 9 executes the facility application 81 based on the related data 84. The facility application 81 based on the related data 84 includes using of the related data 84 by the facility application 81, and outputting of the related data 84 by the facility application 81 outputting, for example. The controller 9 outputs a still image, a moving image, a sound, advertisement information and the like to the head mounted display 1 based on the related data 84 by executing the facility application 81. When the processing of the facility application 81 is complete, the controller 9 proceeds to Step S106 described above. After performing the postprocessing at Step S106, the controller 9 ends the processing procedure illustrated in FIG. 8.

As described above, according to the head mounted display 1, data to be used for processing when the cartridge 1000 is connected to the interface unit 10 may be changed between a case where the head mounted display 1 is inside the specific area and a case where it is not inside the specific area. Therefore, the head mounted display 1 may provide different services inside and outside the specific area when the cartridge data 83 and the related data 84 are stored in the cartridge 1000. When the cartridge 1000 is to be provided to a user, the user may effectively use the cartridge 1000 by the head mounted display 1 without being limited to the specific area.

Figure 9:
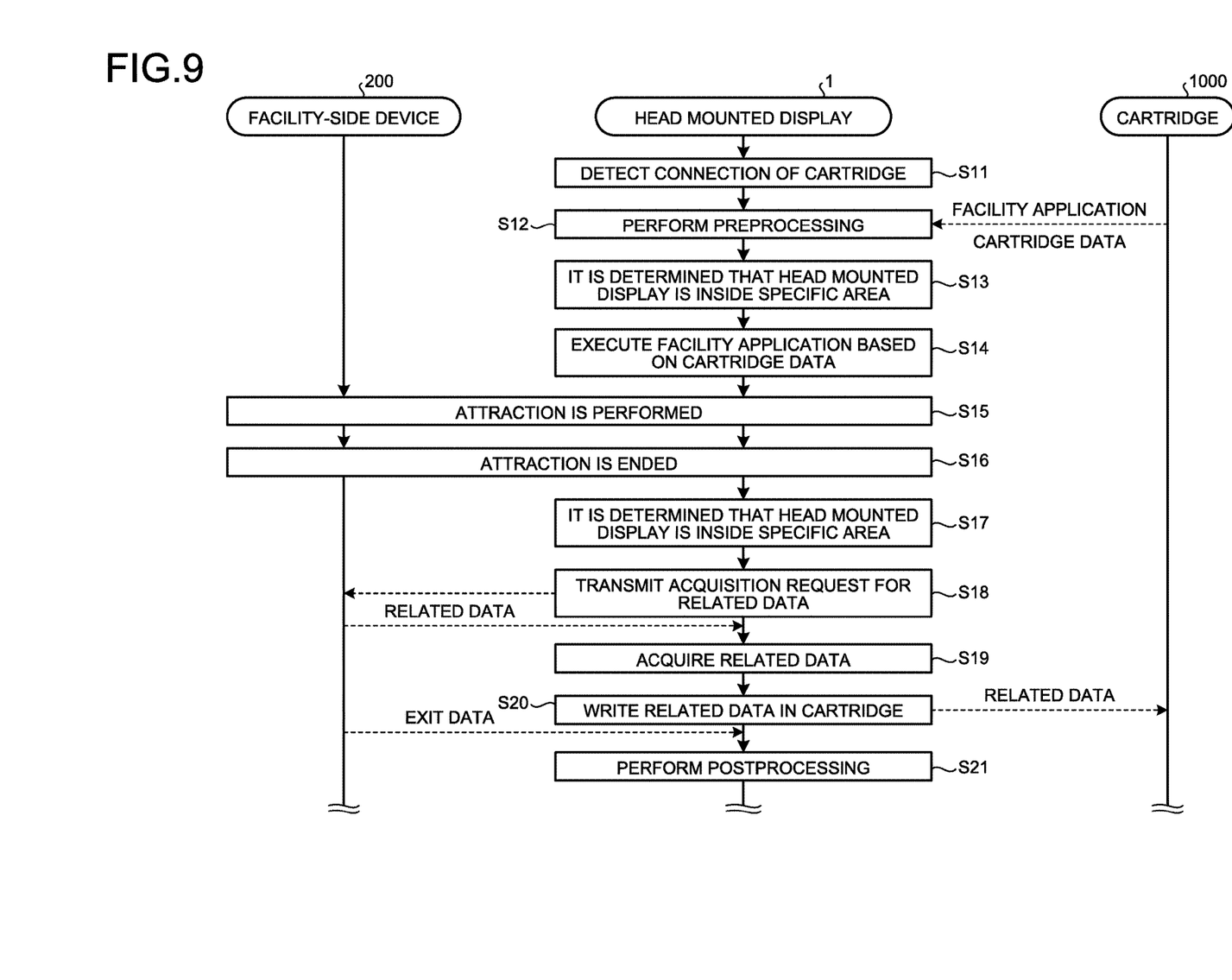
FIG. 9 is a view illustrating another example of control of the head mounted display according to embodiments.

FIG. 9 is a diagram illustrating an example of control of the head mounted display 1 according to embodiments. An example of control when the head mounted display 1 is used in the specific area will be described with reference to FIG. 9.

For example, when receiving the cartridge 1000 at the attraction facility or the like, the user connects the cartridge 1000 to the interface unit 10 of the head mounted display 1. The user wears the head mounted display 1 on his/her head in the specific area, and activates the head mounted display 1.

When detecting the connection of the cartridge 1000 through the interface unit 10 (Step S11), the head mounted display 1 performs the preprocessing (Step S12). The head mounted display 1 acquires, and stores in the storage 8, the facility application 81 and the cartridge data 83 from the cartridge 1000 by performing the preprocessing.

When determining, by the determinator 80c, that it is inside the specific area (Step S13), the head mounted display 1 executes the facility application 81 based on the cartridge data 83 (Step S14). When the facility application 81 based on the cartridge data 83 is executed, the head mounted display 1 is put into a state where an attraction is being performed (Step S15). When the attraction is being performed, the head mounted display 1 performs processing in cooperation with a facility device 200 of the attraction facility. The facility device 200 includes a server and/or a communication device for providing the service related to the attraction, for example. The head mounted display 1 causes the display 2a and the display 2b to display information according to the attraction, by using the display controller 80b. When the attraction is over (Step S16), the head mounted display 1 ends the execution of the facility application 81.

When the attraction is ended, the facility device 200 is put into a state where the related data 84 for the user can be provided. The facility device 200 may alternatively start providing the related data 84 for the user while the attraction is being performed.

When determining that the head mounted display 1 is inside the specific area (Step S17), the head mounted display 1 transmits to the facility device 200, through the communicator 7, an acquisition request for the related data 84 (Step S18). The facility device 200 therefore produces the related data 84. For example, the facility device 200 collects data of a still image, a moving image or the like of the user on an attraction vehicle based on identification information included in the acquisition request. For example, when the user is seated at a specified seat of the attraction, the facility device 200 produces the related data 84 based on the position of the seat or the like. The facility device 200 produces the related data 84 based on the collected data. The facility device 200 transmits the produces related data 84 to the head mounted display 1.

When the related data 84 received from the facility device 200 is acquired through the communicator 7 (Step S19), the head mounted display 1 writes the related data 84 in the cartridge 1000 by the interface unit 10 (Step S20). The head mounted display 1 is thereby put into a state where the head mounted display 1 can execute the facility application 81 based on the related data 84.

When the attraction is ended, the user moves toward a gate to leave the specific area. When exit data is received from the facility device 200 or the like through the communicator 7, the head mounted display 1 performs postprocessing (Step S21). When the postprocessing is complete, the head mounted display 1 is put into a standby state or a power-off state.

The head mounted display 1 is capable of acquiring the related data 84 inside the specific area, and of saving the related data 84 in the cartridge 1000 provided to the user. The user is thereby enabled to effectively use the cartridge 1000 based on the related data 84 outside the specific area. If the related data 84 is data for recommending a revisit, the head mounted display 1 may recommend a revisit to the user based on the related data 84. The head mounted display 1 can increase the value of the cartridge 1000 provided to the user by adding the related data 84 to the cartridge 1000 of the user.

In embodiments described above, a case is described where the head mounted display 1 executes the facility application 81 based on the related data 84 when the head mounted display 1 is determined not to be in the specific area; however, embodiments are not limited thereto. For example, the head mounted display 1 may execute the facility application 81 based on the related data 84 according to a request from the user, when the head mounted display 1 is inside the specific area. The head mounted display 1 may thereby make the user check the related data 84 in the cartridge 1000 in the specific area, and thus, use of the related data 84 outside the specific area may be urged.

Figure 10:
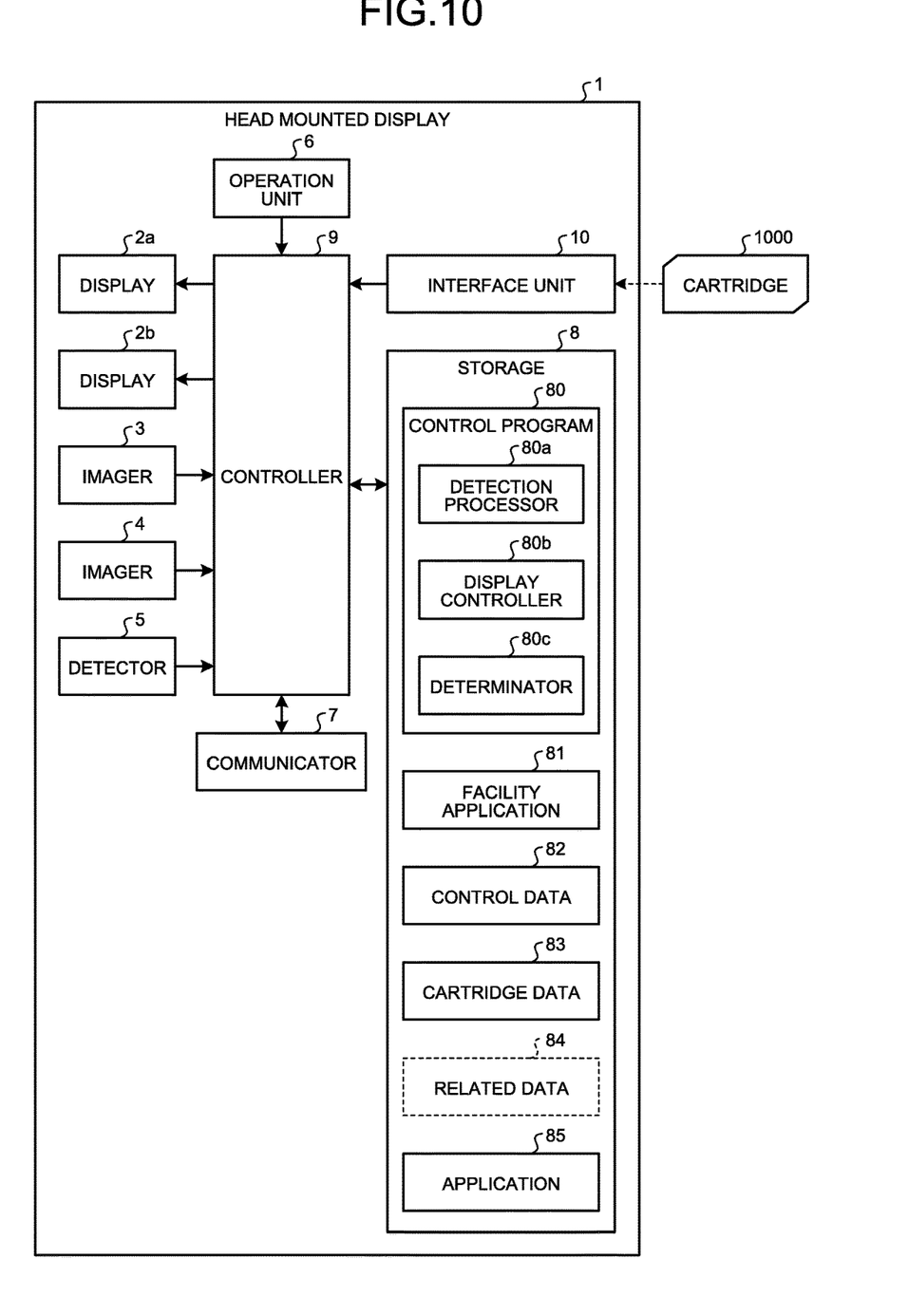
FIG. 10 is a block diagram illustrating another example of the functional configuration of the head mounted display according to embodiments.

FIG. 10 is a block diagram illustrating another example of the functional configuration of the head mounted display 1 according to embodiments. Another example of the functional configuration of the head mounted display 1 will be described with reference to FIG. 10. In the following description, the same structural components are denoted by the same reference numerals, and overlapping description may be omitted.

As illustrated in FIG. 10, the head mounted display 1 is configured to include a display 2*a*, a display 2*b*, an imager 3, an imager 4, a detector 5, an operation unit 6, a communicator 7, a storage 8, a controller 9, and an interface unit 10. The configuration of the head mounted display 1 is the same as the configuration of the head mounted display 1 illustrated in FIG. 2 except the storage 8.

Data stored in the storage 8 of the head mounted display 1 includes an application 85, which is associated with related data 84 and different from the facility application 81. The application 85 includes an application which can output the related data 84 to the head mounted display 1. The application 85 includes an application which is installed in the head mounted display 1. The application 85 is an application for causing the controller 9 to realize functions of the head mounted display 1. When the related data 84 is image data, the application 85 includes an application for a browser, moving image reproduction or the like, for example. The application 85 may be installed in the storage 8 by a cartridge 1000.

Figure 11:
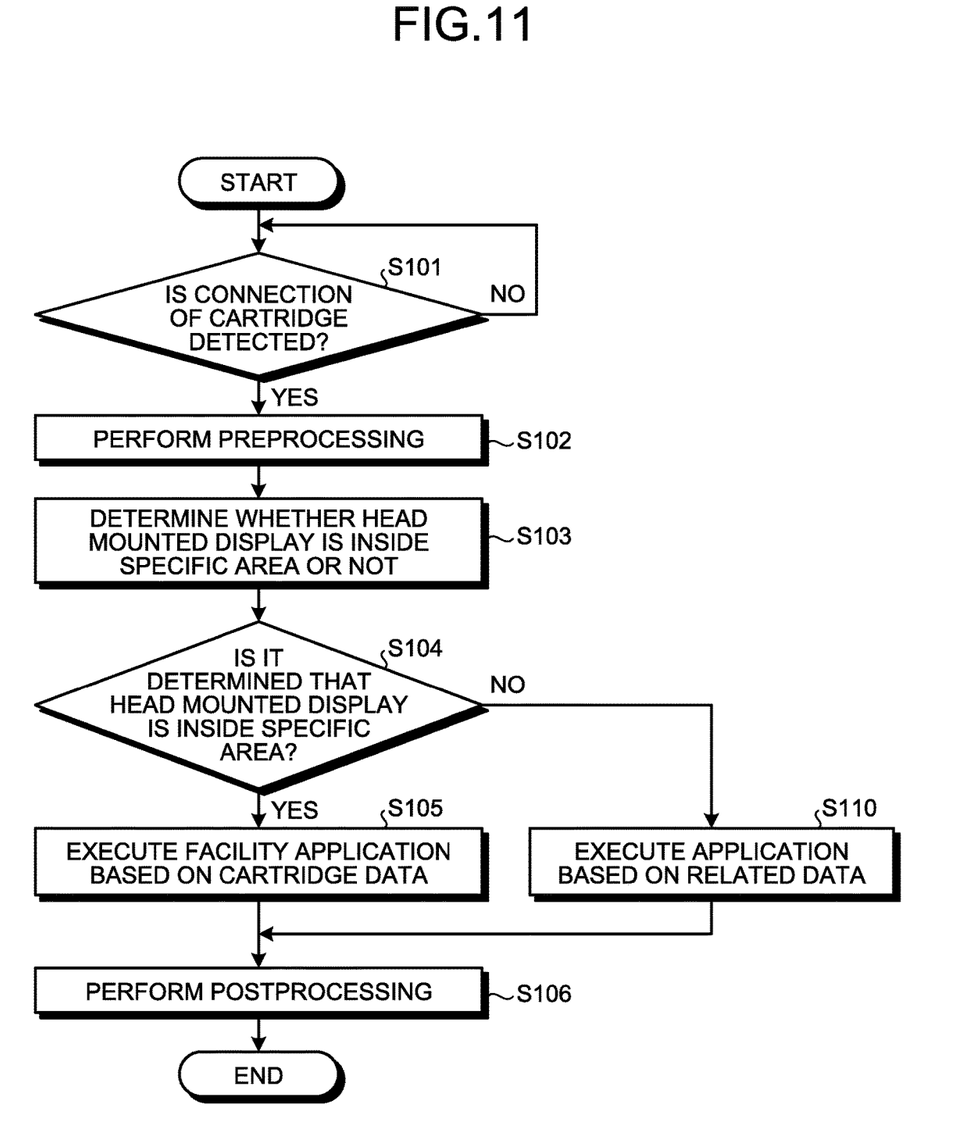
FIG. 11 is a flowchart illustrating an example of a process of control by the head mounted display according to embodiments.

FIG. 11 is a flowchart illustrating another example of the processing procedure of the control by the head mounted display 1 according to embodiments. The processing procedure illustrated in FIG. 11 is realized by the controller 9 executing the control program 80.

In the example illustrated in FIG. 11, the processes from Step S101 to Step S106 are the same as the processes from Step S101 to Step S106 illustrated in FIG. 8, and thus, only the differences will be described and description of the same processes will be omitted.

As illustrated in FIG. 11, the controller 9 of the head mounted display 1 performs the processes from Step S101 to Step S103, and when the head mounted display 1 is determined not to be inside the specific area (No at Step S104), the process proceeds to Step S110. At Step S110, the controller 9 executes the application 85 based on the related data 84. The controller 9 executes the application 85 that is associated with the related data 84. By executing the application 85 installed in the head mounted display 1, the controller 9 causes the display 2*a* and the display 2*b* to display information based on the related data 84. When processing of the application 85 is complete, the controller 9 proceeds to Step S106 described above. After performing the postprocessing, the controller 9 ends the processing procedure illustrated in FIG. 11.

As described above, when determined not to be inside the specific area at the time of the connection of the cartridge 1000 to the interface unit 10, the head mounted display 1 may output the related data 84 to the user by the application 85. As a result, when the attraction facility side provides the cartridge 1000 to the user, the head mounted display 1 may save, in the cartridge 1000, the related data 84 which is not associated with the facility application 81 of the cartridge 1000.

In embodiments described above, a case is described where the head mounted display 1 acquires the facility application 81 from the cartridge 1000; however, embodiments are not limited thereto. For example, the head mounted display 1 may acquire the facility application 81 from a server on the attraction facility side through the communicator 7.

In embodiments described above, a case is described where the head mounted display 1 acquires the related data 84, which is second data, inside the specific area; however, embodiments are not limited thereto. For example, the head mounted display 1 may acquire the second data outside the specific area. In this case, the head mounted display 1 may acquire the second data outside the specific area by using an access code, an address or the like provided by the attraction facility.

In embodiments, configurations and operations of the head mounted display 1 has been described, but the head mounted display 1 is not limited thereto, and may be configured as a method including respective component elements.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A head mounted display comprising:
a storage;
an interface unit configured to be connected with a cartridge being different from the storage;
a determinator configured to determine whether the head mounted display is inside a specific area or not when the cartridge is connected to the interface unit; and
at least one controller configured to execute, when the determinator determines that the head mounted display is inside the specific area, the an application based on first data that is acquired from the cartridge, and to execute, when the determinator determines that the head mounted display is not inside the specific area, another application for displaying second data that is acquired from the cartridge, wherein
the at least one controller is further configured to acquire the second data according to the execution of the application based on the first data, and write the acquired second data in the cartridge through the interface unit, and
the head mounted display is contained within a pair of eyeglasses comprising two temples and a front, each temple having one end portion connected to the front via a hinge, and
the cartridge is configured to be installed in an opening provided in one surface of contact of one of the end portions connected with the front.

2. The head mounted display according to claim 1, wherein the second data is data that is acquired inside the specific area.

3. The head mounted display according to claim 2, wherein the at least one controller is further configured to acquire the second data according to the execution of the application based on the first data, and write the acquired second data in the cartridge through the interface unit.

4. The head mounted display according to claim 1, wherein
the opening is configured to be covered when the temple having the opening is completely opened.

5. The head mounted display according to claim 1, wherein the cartridge is directly connected to the interface unit.

6. The head mounted display according to claim 1, wherein the head mounted display is entirely contained within a pair of eyeglasses, and the cartridge is insertably-removable to the eyeglasses.

* * * * *